Figure 2:
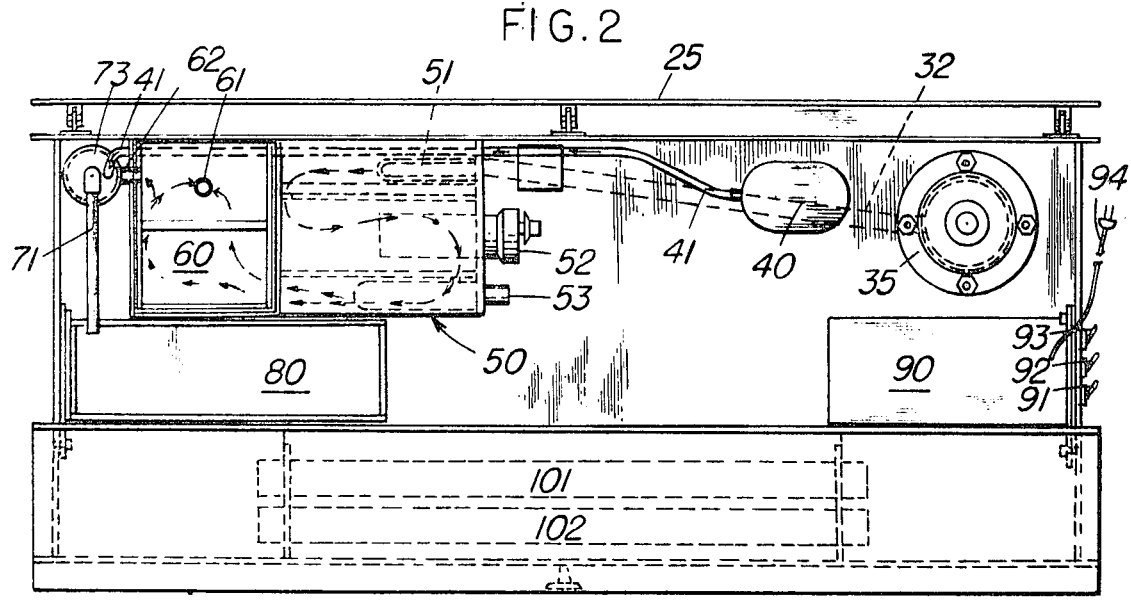

United States Patent

Feddern et al.

[15] 3,638,795
[45] Feb. 1, 1972

[54] POWER HOOD

[72] Inventors: Henry A. Feddern; John A. Sabol, both of Miami, Fla.

[73] Assignee: Precision Valve Corporation, Yonkers, N.Y.

[22] Filed: Nov. 13, 1969

[21] Appl. No.: 876,392

[52] U.S. Cl. ........................................................210/169
[51] Int. Cl. ...............................................E04h 3/20
[58] Field of Search.....................................119/5; 210/169

[56] References Cited

UNITED STATES PATENTS 3,125,065   3/1964   Willinger..................................119/5
3,535,513   10/1970   Cirami......................................119/5
3,515,097   6/1970   Sherman....................................119/5

Primary Examiner—Reuben Friedman
Assistant Examiner—T. A. Granger
Attorney—Davis, Hoxie, Faithfull & Hapgood

[57] ABSTRACT

A covering hood for an aquarium tank incorporates water and air pumps, a filter, heater means, ultraviolet irradiation means, lights and an organic-material-removal device into a two-section structure wherein the front section is hinged for access to the aquarium. The hood is particularly adapted to cooperate with a gravel bed filter unit located near the bottom of the aquarium to form therewith a complete aquarium water treatment and circulation system.

7 Claims, 5 Drawing Figures

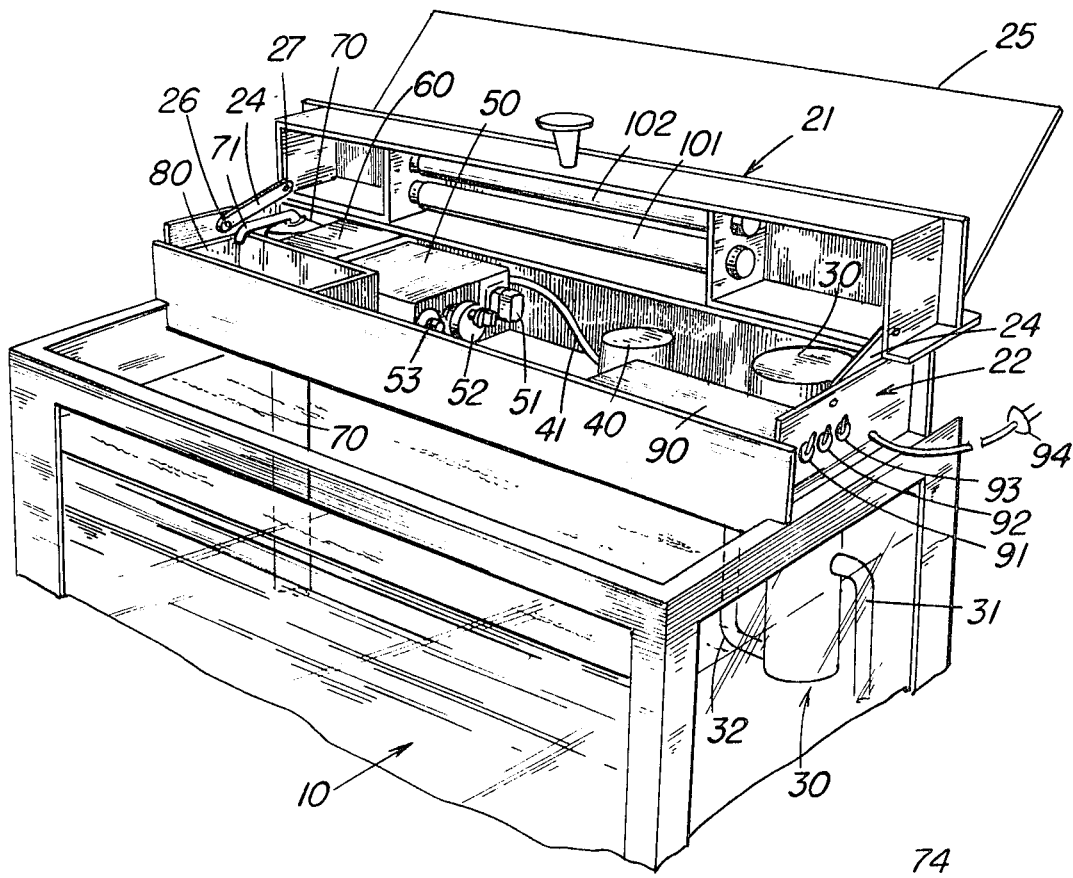
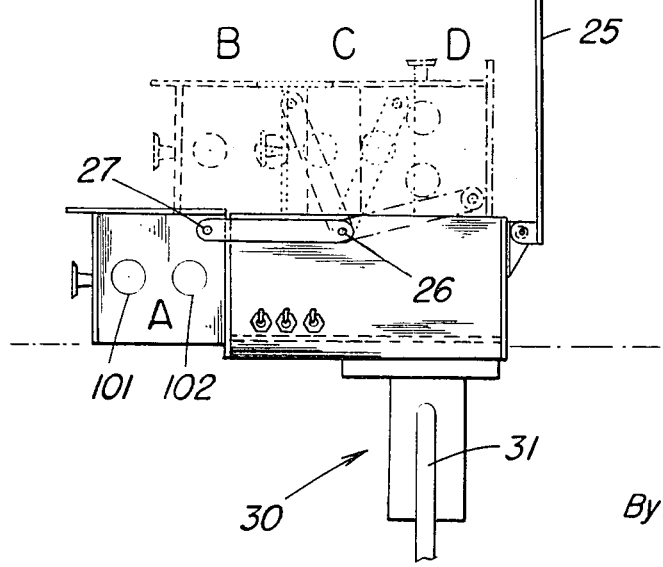
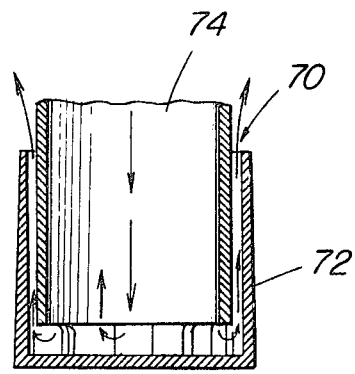
Inventors
Henry A. Feddern
John A. Sabol
By Davis, Hoxie, Faithfull & Hapgood
Attorneys

PATENTED FEB 1 1972 3,638,795

SHEET 2 OF 2

Inventors
Henry A. Feddern
John A. Sabol
By Davis, Hoxie, Faithfull & Hapgood
Attorneys

POWER HOOD

The present invention contains in a single hood unit various devices for illuminating, oxygenating, filtering, heating, irradiating and otherwise treating aquarium water. The unit contains a fluorescent lamp for illuminating the aquarium and a long-wave ultraviolet lamp for retardation of harmful organisms and for promoting fish disease therapy. The unit serves as an aquarium hood to retard evaporation, splashing, etc.

By uniting into one unit the various lamps and water-treatment devices and their associating wiring and piping, only a single power cord emerges from the unit. Heretofore, each lamp and water-treatment device required separate power cords and piping thereby creating an unsightly collection of pipes and wires leading to and from the aquarium.

The present invention is a power hood which is divided into two sections which are hinged together through hinge links to permit the forward section to be raised for access to the aquarium and to the various lamps.

The power hood is preferably operated in conjunction with a gravel bed filter in the bottom of the aquarium to form a complete water circulation and treatment system.

The apparatus of the present invention is particularly useful with salt water aquaria which require close control of water condition and which create problems of salt water corrosion and salt deposition on nearby surfaces. Salt rapidly creates corrosion and encrustation problems with the various pipes, wires and units leading to early failure and unsightly appearance. The self-contained nature of the present invention obviates these problems.

IN THE DRAWINGS

Figure 3:
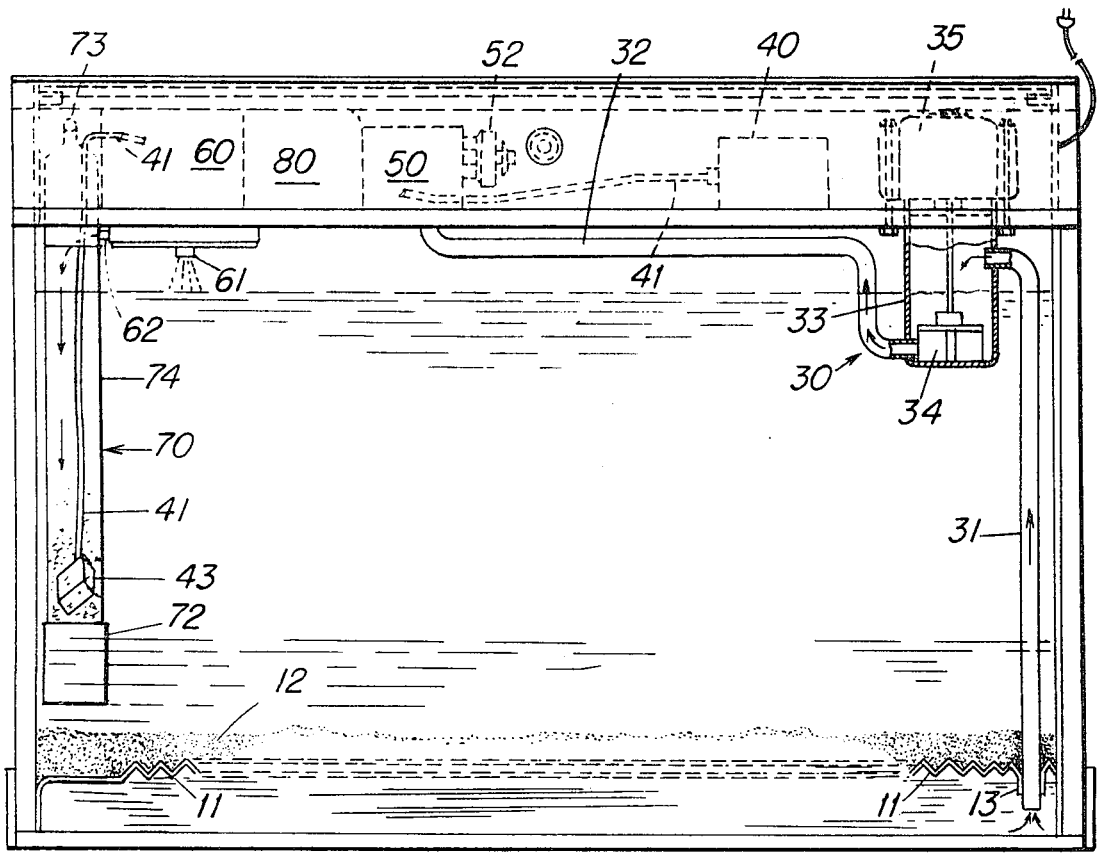

FIG. 1 is a perspective view of the power hood of the present invention in position on an aquarium tank, FIG. 2 is a plan view of the power hood, FIG. 3 is an elevational view of the front of the aquarium tank and power hood, FIG. 4 is an end view of the aquarium tank and the power hood, showing in dotted outline the several positions which the hinged front section of the power hood can assume, and FIG. 5 is a detail view in section of the lower end of the organic-material-removal apparatus.

A conventional aquarium tank 10 is open to atmosphere at its top. The power hood of the present invention is placed on the open top of the aquarium and serves as a hood or cover to reduce evaporation and contamination of the aquarium water. The power hood of the present invention is formed in two sections 21 and 22. Front section 21 is hingedly attached to the larger rear section 22.

Rear section 22 is in the form of a tray and contains various water-conditioning devices. These include a water-circulation pump 30, an air pump 40, a three-compartment water-treatment device 50 which includes a short-wave ultraviolet lamp 51, a heater control thermostat 52, and an electrical resistance heater unit 53 controlled by the heater thermostat. In communication with the water-treatment device 50 is a filter compartment 60 which includes a filter medium, an overflow drain 61, and an outlet pipe 62. The outlet pipe 62 connects with the inlet of an organic-material removal apparatus 70. Organic waste collected by the apparatus 70 is discharged from an outlet 71 which deposits the collected organic matter in a collector tray 80. An electrical control box 90 includes control circuitry for the above enumerated devices and includes ballast transformers for the several lights. Switches 91-93 independently and collectively control the lights, pumps, and heater. A lid 25 is hinged to the rear section 22 to cover the various devices housed in the rear section.

The front section of the power hood contains a long-wave ultraviolet lamp 101 and a fluorescent lamp 102.

The front section is hinged to the rear section by hinge links 24 attached at one end to the front section by a pivot means 27 and to the rear section by pivot means 26 which permit the front section to be raised and placed on the rear section in any of several attitudes A-D shown in FIG. 4. Position A is the normal closed position. Position B is convenient for access to the aquarium proper while preserving at least a portion of the illumination. Position C is a fully open position. Position D is convenient for maintenance of the lamps 101 and 102. Access to the rear section is gained by raising lid 25.

The various water-conditioning devices will now be described in greater detail in the sequence in which water circulates through the system.

The first water-conditioning means encountered by aquarium water is a gravel bed filter which removes relatively large particulate matter. The gravel bed filter comprises a layer or bed 12 of sand or gravel which lies on a perforate platform 11 spaced away from the bottom of the aquarium. Drawing water from beneath the perforate platform 11 by means of the pump 30 will cause aquarium water to pass through the gravel bed wherein particulate matter is entrapped in the bed 12. The platform 11 is provided with an outlet fitting 13 to which the pump-inlet pipe 31 is connected.

The pump 30 is illustrated in FIG. 3 as being of the centrifugal type wherein a motor 35 drives an impeller 34 to expel water from the pump chamber 33 through the outlet. In the illustrated preferred embodiment, the inlet pipe 31 enters a pump chamber 33 at a position substantially above the impeller 34. The outlet pipe 32 is arranged with a vertical portion such that water will remain entrapped in the pump chamber 33 when the pump is turned off. When the pump is started the entrapped water is acted upon by the impeller 34 to create a partial vacuum in the pump chamber 33 which draws water up the inlet tube 31. After an initial use, the pump does not again require priming when started. It is apparent that other forms of pumps than this preferred form may be used.

The pump-outlet pipe 32 is connected to a water-treatment device 50. This device comprises three compartments in communication such that water passes from compartment to compartment in a sinuous path. The first compartment is connected to the water-pump-outlet pipe 32. This compartment contains a short-wave ultraviolet lamp 51 which irradiates the water to retard harmful micro-organisms. The second compartment includes an adjustable thermostat unit 52 which senses the water temperature. The third compartment includes an electrical resistance heater unit 53 which operates in response to the thermostat unit 52 to sustain a desired water temperature.

Water leaving the treatment device 50 flows through a filter compartment 60 which contains a filter medium such as glass or plastic fiber, porous ceramic, charcoal, or the like and may be used to dispense dissolvable substances. The filter medium removes particulate matter which was not arrested by the gravel bed filter. The filter compartment is provided with an outlet pipe 62 and with an overflow pipe 61. The outlet pipe conveys a portion of the water to an organic-waste-removal apparatus 70. The remainder of the water is directly returned to the aquarium through the overflow pipe.

The organic-material-removal apparatus 70 is constructed and operated according to the basic principles set forth in our copending application Ser. No. 818,180 filed Mar. 26, 1969 and entitled Water Purifier. The apparatus 70 comprises a vertical tower tube 74 having an upper cap structure 73 at the upper end and a lower vented end fitting 72 at the lower end which provides an outlet vent for exhaust to the aquarium proper. FIG. 5 shows the arrangement of this lower end outlet structure. An airhose 41 from the air pump 40 leads down the interior of the tower tube to a porous block 43 for the formation of a cloud of small air bubbles. The upper cap 73 includes an aperture to accommodate the airhose 41, the water-outlet pipe 62 of the filter compartment, and a foam-discharge pipe 71 which deposits accumulated foam in a collector tray 80.

The air pump 40 is a conventional aquarium air pump of the vibrator variety.

The rear section 22 also includes a compartment 90 which contains the necessary electrical circuitry for the various electrically operated devices. Compartment 90 also contains the ballast coils for the lamps. Switches 91–93 are mounted on a sidewall of and with their terminal portions within compartment 90. The switches are arranged to control the lamps and pumps independently and collectively. A power cord 94 emerges from compartment 90.

In operation, water is drawn down through the gravel bed 12 to remove particulate matter. The water below the perforate platform 11 is drawn up the pump-inlet pipe 31 to the pump chamber. The pump forces the water through the pump-outlet pipe 32 and into the first of the three compartments of the water-treatment device 50 where it is irradiated by ultraviolet lamp 51 to control the growth of micro-organisms and effect other water conditioning results attributed to the use of such light. The water moves on to the second compartment where its temperature is sensed by thermostat 52 and to the last compartment where it is heated by heater 53 if necessary. From the last compartment the water is introduced to the filter compartment 60 wherein fine particulate matter is removed. A portion of this water flows through outlet pipe 62 to the organic-material-removal apparatus 70. The remainder of the water flows directly back into the aquarium through an overflow pipe 61. Water entering the upper cap 73 of the organic-material-removal apparatus from the outlet pipe 62 descends to tower tube 74 and exhausts through the vent space between outlet fitting 72 and the tower tube 74 to return the water to the aquarium. Alternatively, the lower end of the tower tube can be arranged to exhaust directly to the space below gravel bed filter platform 11. As the water descends the tower it encounters a rising cloud of small air bubbles which are discharged by the porous block 43. Block 43 is supplied with air under pressure from air pump 40 through airhose 41. A portion of the air is dissolved into the water to oxygenate the water and the remainder of the bubble cloud rises contra the flow of water. Minute particulate matter such as waste organic matter and microscopic life are entrapped by the bubbles to concentrate in a foam which floats on the surface of the water in the tower. The accumulated foam is discharged through the discharge tube 71 and collected in collector tray 80 for periodic disposal. The introduction of water to the top of the tower tube creates a downward flow of water through the tower tube.

Thus, the present invention regulates the temperature, aerates, cleans, filters and distributes the water. It keeps micro-organisms to a low level and removes parasites and disease organisms continuously to thereby prevent their spread among the fish.

The majority of the various parts and units of the present invention are preferably fabricated or molded of plastics. Only the electrical units need to contain metal parts and those units can be readily sealed against corrosion. The ability to make the device of the present invention from plastic eliminates problems of corrosion to result in a device particularly well suited to salt water aquaria. The design of the water circulation prevents splashing, thus reducing the accumulation of salt encrustations and reducing noise.

We claim:

1. A hood for covering the open top of an aquarium comprising juxtaposed front and rear boxlike structures, the rear being in the form of a tray adapted for positioning on top of an aquarium toward the rear thereof and the front housing means for illuminating the aquarium, the boxlike structures being connected together by link members the ends of which are pivotally secured to the boxlike structures such that the front boxlike structure can be moved from a position in which it is in front of the rear structure and on top of the aquarium and pivoted with respect to and placed upon the rear boxlike structure in a first attitude wherein at least a portion of the light from the illuminating means if able to illuminate the aquarium, which attitude also provides access to the aquarium, or in a second more rearward attitude wherein access to the aquarium is greater, or in a third attitude wherein the front boxlike section is rotated for access to the illuminating means.

2. The hood of claim 1 wherein the rear boxlike structure contains a water-circulating pump having an inlet in communication with the aquarium, an air pump, and a thermostatically controlled water heater.

3. The hood of claim 2 in combination with a gravel bed filter unit, the water space beneath the gravel bed filter unit being in communication with the inlet of the water-circulating pump.

14. The hood of claim 2 wherein at least a portion of the water circulated by the water-circulating pump is returned to the aquarium through an organic-material-removal apparatus which includes a vertical tube through which the returning water flows downwardly against the rising cloud of air bubbles created in a lower portion of the tube with air from the air pump.

5. The hood of claim 4 in combination with a gravel bed filter unit wherein the water space beneath the gravel bed filter unit is in communication with the inlet of the water-circulating pump.

6. The hood of claim 1 wherein the front boxlike structure includes a long-wave ultraviolet lamp.

7. The hood of claim 2 wherein the rear boxlike structure also includes a short-wave ultraviolet lamp in the path of the circulated water.

* * * * *